United States Patent [19]

Langley

[11] 4,374,228

[45] Feb. 15, 1983

[54] WHOLLY AROMATIC POLYESTER CAPABLE OF FORMING AN ANISOTROPIC MELT PHASE CONSISTING ESSENTIALLY OF PARA-OXYBENZOYL MOIETY, BROMO-SUBSTITUTED-PARA-OXYBENZ-OYL MOIETY, AND META-OXYBENZOYL MOIETY

[75] Inventor: Jeffrey T. Langley, Pineville, N.C.

[73] Assignee: Fiber Industries, Inc., New York, N.Y.

[21] Appl. No.: 289,587

[22] Filed: Aug. 3, 1981

[51] Int. Cl.$^3$ .............................................. C08G 63/02
[52] U.S. Cl. .................................. 524/599; 528/191; 528/193; 528/206; 528/271; 528/272; 528/299; 528/305
[58] Field of Search ............... 528/191, 193, 206, 271, 528/272, 299, 305; 260/40 R, 40 P; 524/599

[56] References Cited

U.S. PATENT DOCUMENTS 3,444,131  5/1969  Rosenbrock et al. ............... 528/206
3,759,870  9/1973  Economy et al. ................... 528/206
3,767,621  10/1973 Suzuki et al. ........................ 528/206
4,067,852  1/1978  Calundann ........................... 528/193
4,130,545  12/1978 Calundann ........................... 260/40 P
4,146,702  3/1979  Morris et al. ........................ 528/193
4,267,304  5/1981  Feasey et al. ....................... 528/191

Primary Examiner—Lester L. Lee
Attorney, Agent, or Firm—Burns, Doane, Swecker & Mathis

[57] ABSTRACT

A novel wholly aromatic polyester is provided which exhibits an anisotropic melt phase and which is capable of readily undergoing melt processing. The polyester of the present invention consists essentially of the recurring units (a) paraoxybenzoyl moiety, (b) bromo-substituted-para-oxybenzoyl moiety, and (c) meta-oxybenzoyl moiety. The resulting polymer may be economically produced. Additionally, it may be melt processed at an advantageous temperature which makes possible the utilization of standard equipment such as that heretofore utilized for the melt processing of polyethylene terephthalate.

20 Claims, No Drawings

WHOLLY AROMATIC POLYESTER CAPABLE OF FORMING AN ANISOTROPIC MELT PHASE CONSISTING ESSENTIALLY OF PARA-OXYBENZOYL MOIETY, BROMO-SUBSTITUTED-PARA-OXYBENZOYL MOIETY, AND META-OXYBENZOYL MOIETY

BACKGROUND OF THE INVENTION

Wholly aromatic polyester resins long have been known. For instance, 4-hydroxybenzoic acid homopolymer and copolymers have been provided in the past. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point. Other amorphous wholly aromatic polyesters when molten frequently exhibit an isotropic melt phase. With the crystalline polymers molding techniques such as compression molding or sintering may be utilized; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b), *Polyarylates (Polyesters From Aromatic Dicarboxylic Acids and Bisphenols)*, by G. Bier, Polymer, Vol. 15, Pages 527 to 535 (August 1974), (c) Aromatic Polyester Plastics, by S. G. Cottis, Modern Plastics, Pages 62 to 63 (July 1975); and (d) *Poly(p-Oxybenzoyl Systems): Homopolymer for Coatings: Copolymers for Compression and Injection Molding*, by Roger S. Storm and Steven G. Cottis, Coating Plast. Preprint, Vol. 34, No. 1, Pages 194 to 197 (April 1974). See also, U.S. Pat. Nos. 3,039,994; 3,169,121; 3,321,437; 3,549,593; 3,553,167; 3,637,595; 3,651,014; 3,723,388; 3,759,870; 3,767,621; 3,778,410; 3,787,370; 3,790,528; 3,829,406; 3,890,256; and 3,975,487.

In U.S. Pat. No. 3,549,593 identified above is disclosed a polyester comprising recurring units derived from certain substituted hydroxybenzoic acids wherein the substitution is a lower alky group or a lower aryl group.

Also, it more recently has been disclosed that certain polyesters may be formed which exhibit melt anisotropy. See, for instance, (a) *Polyester X7G-A Self Reinforced Thermoplastic*, by W. J. Jackson, Jr., H. F. Kuhfuss and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat Nos. 838,935 and 828,936, (c) Dutch Pat. No. 7505551, (d) West German Pat. Nos. 2520819, 2520820, 2722120, 2834535, 2834536 and 2834537, (e) Japanese Pat. Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,245,082; 4,245,084; 4,247,514; 4,256,624; 4,265,802; 4,267,289; 4,269,965; and 4,279,803 (g) U.K. application No. 2,002,404; and (h) European patent application Nos. 0008855, 0018145. See also U.S. Ser. Nos. 109,575, filed Jan. 4, 1980 (now U.S. Pat. No. 4,285,852); ; 128,759, filed Mar. 10, 1980 (now U.S. Pat. No. 4,299,756) filed July 15, 1980 (now U.S. Pat. No. 4,337,190); and 194,196, filed Oct. 6, 1980 (now U.S. Pat. No. 4,318,841).

It is an object of the present invention to provide a novel wholly aromatic polyester which is capable of forming an anisotropic melt phase.

It is an object of the present invention to provide a wholly aromatic polyester which is capable of readily undergoing melt processing.

It is an object of the present invention to provide an wholly aromatic polyester which may be formed on a relatively economical basis.

It is an object of the present invention to provide a wholly aromatic polyester which is capable of being melt processed using standard equipment commonly selected for the melt processing of polyethylene terephthalate.

It is another object of the present invention to provide a wholly aromatic polyester which is particularly suited for injection molding to form three-dimensional shaped articles, etc.

These and other objects, as well as the scope, nature and utilization of the invention will be apparent to those skilled in the art from the following detailed description.

SUMMARY OF THE INVENTION

It has been found that a melt processable wholly aromatic polyester capable of forming an anisotropic melt phase at a temperature below approximately 300° C. consists essentially of the recurring moieties, I, II, and III wherein:

I is ,

II is 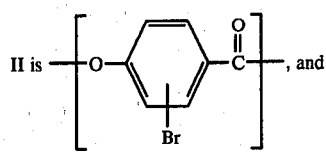, and

III is 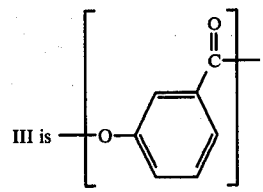, wherein the polyester comprises approximately 35 to 70 mole percent of moiety I, approximately 15 to 45 mole percent of moiety II, and approximately 15 to 45 mole percent of moiety III.

DESCRIPTION OF PREFERRED EMBODIMENTS

The wholly aromatic polyester of the present invention consists essentially of three recurring moieties which when combined as described hereafter have been found to yield a polymeric product which exhibits an anisotropic melt phase which is capable of readily undergoing melt processing. The aromatic polyester is considered to be "wholly" aromatic in the sense that each moiety present in the polyester contributes at least one aromatic ring to the polymer backbone. The wholly aromatic polyester is capable of forming an anisotropic melt phase below approximately 300° C. In a preferred embodiment the wholly aromatic polyester is capable of forming an anisotropic melt phase below approximately 290° C., and below approximately 280° C. in a particularly preferred embodiment. The resulting polyester accordingly advantageously is capable of being melt processed using standard equipment such as that commonly selected for the melt processing of polyethylene terephthalate. Three-dimensional shaped aritcles, etc. commonly may be injection molded from the polyester of the present invention while at a temperature of approximately 240° to 350° C.

Moiety I of the wholly aromatic polyester is a paraoxybenzoyl moiety and possesses the structural formula:

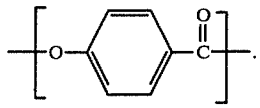

Moiety I comprises approximately 35 to 70 mole percent of the wholly aromatic polyester, and preferably approximately 40 to 50 mole percent. The melting temperature of the resulting wholly aromatic polyester tends to be further lowered as one incorporates the para-oxybenzoyl moiety in the more preferred quantities.

Moiety II of the wholly aromatic polyester is a bromo-substituted-para-oxybenzoyl moiety of the structural formula:

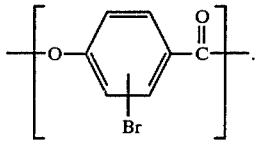

Moiety II comprises approximately 15 to 45 mole percent of the wholly aromatic polyester, and preferably 30 to 40 mole percent. It is preferred that each aromatic ring of moiety II be mono-brominated as illustrated; however, di-brominated aromatic rings may be present in the polyester to at least a minor degree without undue sacrifice of stability of the polymeric product. A suitable source for moiety II readily may be formed by the bromination of para-hydroxybenzoic acid in accordance with the procedure wherein a stoichiometric amount of bromine is added slowly to a stirred solution of para-hydroxybenzoic acid in acetic acid, the reactants heated to promote the reaction, and the contents of the reactor cooled so as to enable the recovery of 4-acetoxy-3-bromobenzoic acid as a white crystalline product.

Moiety III of the wholly aromatic polyester of a metaoxybenzoyl moiety of the structural formula:

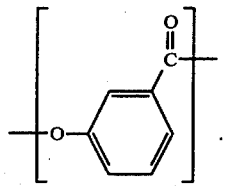

Moiety III comprises approximately 15 to 45 mole percent of the wholly aromatic polyester, and preferably 15 to 25 mole percent of the wholly aromatic polyester.

Other ester-forming moieties (e.g., those derived from other aromatic hydroxy acids, aromatic diols, aromatic diacids) than those previously discussed additionally may be included in the wholly aromatic polyester of the present invention in a minor concentration so long as such moieties conform to the above criteria and do not adversely influence the desired anisotropic melt phase or otherwise interfere with the melt processability.

In a preferred embodiment moieties I, II and III as illustrated are the sole moieties present. A preferred wholly aromatic polyester of the present invention comprises approximately 50 mole percent of moiety I, approximately 30 mole percent of moiety II, and approximately 20 mole percent of moiety III. In another preferred embodiment the wholly aromatic polyester of the present invention comprises approximately 40 mole percent of moiety I, approximately 40 mole percent of moiety II, and approximately 20 mole percent of moiety III.

The wholly aromatic polyester of the present invention commonly exhibits

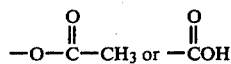

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

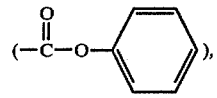

and methylester

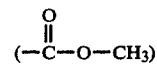

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and o-chloropehnol, and accordingly are not susceptible to solution processing. They can surprisingly be readily processed by common melt processing techniques as discussed hereafter. Some solubility is discernible in pentafluorophenol.

The wholly aromatic polyesters commonly exhibit an inherent viscosity (i.e., I.V.) of at least approximately 1 dl./gram, and preferably 1.5 to 4.0 dl./gram, when dissolved in a concentration of 0.03 weight/volume percent in pentafluorophenol at 60° C.

Unlike the aromatic polyesters often encountered in the prior art, the wholly aromatic polyester of the present invention is not intractable and forms an anisotropic melt phase whereby order is manifest in the molten polymer. The subject polyester readily forms liquid crystals in the melt phase and accordingly exhibits a high tendency for the polymer chains to orient in the shear direction. Such anisotropic properties are manifest at a temperature which is readily amenable for melt processing in order to form shaped articles, etc. Such anisotropy in the melt may be confirmed by conventional polarized light techniques whereby crossed-polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed-polarizers. The amount of light transmitted increases when the sample is sheared (i.e., is made to flow); however, the sample is optically anisotropic even in the static state. On the contrary, typical aromatic polyesters do not transmit light to any substanatial degree when examined under identical conditions.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc.

The organic monomer compounds may be reacted in the absence of a heat exchange fluid via a melt acidolysis procedure. The monomers are melted in an inert atmosphere. Polymerization can be initiated at approximately 250° C. and the temperature of the melt subsequently is raised. During a final portion of the polymerization a vacuum can be applied to remove volatiles while the temperature is within the range of approximately 300° to 340° C. The polymer product then is recovered.

As set forth in U.S. Pat. No. 4,067,852, of Gordon W. Calundann, entitled, "Melt Processable Thermotropic Wholly Aromatic Polyester Containing Polyoxybenzoyl Units" is described a slurry polymerization process which may be employed to form the wholly aromatic polyester of the present invention wherein the solid product is suspended in a heat exchange medium. The disclosure of this patent is herein incorporated by reference.

When employing either the melt acidolysis procedure of the slurry procedure of U.S. Pat. No. 4,067,852, the organic monomer reactants from which the para-oxybenzoyl moiety (i.e., moiety I), bromo-substituted-para-oxubenzoyl moiety (i.e., moiety II), and meta-oxybenzoyl moiety (i.e., moiety III) are derived may be initially provided in a modified form whereby the usual hydroxyl groups of these monomers are esterified (i.e., they are provided as acyl esters). For instance, lower acyl esters of para-hydroxybenzoic acid, para-hydroxy-2-bromobenzoic acid or para-hydroxy-3-bromobenzoic acid, and meta-hydroxybenzoic acid wherein the hydroxy groups are esterified may be provided as reactants. The lower acyl groups preferably have from about 2 to about 4 carbon atoms. Preferably the acetate esters of the organic compounds which form moieties, I, II and III are provided. Accordingly, particularly preferred reactants for the condensation reaction are para-acetoxybenzoic acid, 4-acetoxy-2-bromobenzoic acid, or 4-acetoxy-3-bromobenzoic acid, and meta-acetoxybenzoic acid. If minor quantities of other aryl reactants (as previously discussed) optionally provide oxy-units within the resulting polymer, these too preferably are provided as the corresponding lower acyl esters. Relative quantities of organic monomer reactants are provided in the reaction zone so that the potential dicarboxy units and dioxy units available for incorporation in the resulting wholly aromatic polyester are substantially equal.

Representative catalysts which optionally may be employed in either the melt hydrolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts or carboxylic acids, the gaseous acid catalysts such as Lewis acids (e.g., $BF_3$), hydrogen halides (e.g., HCL), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g., in a nitrogen atmosphere) at a temperature of about 260° C. for 10 to 12 hours.

The wholly aromatic polyester of the present invention can be melt processed with ease to form a variety of shaped articles, and is particularly suited for injection molding to form three-dimensional shaped articles. Fibers and films also may be melt extruded.

As previously indicated the wholly aromatic polyesters of the present invention commonly may be melt processed at a temperature of approximately 240° to 350° C. The ability to melt process the same at such lower temperatures reduces equipment costs and minimizes the degradation of the polymer while maintained at the melting temperature.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material, film, or three-dimensional shaped article optionally may be subjected to a thermal treatment whereby its physical properties are further enhanced. For instance, the tenacity of the fiber or film generally is increased by such thermal treatment. More specifically, the fibers or films may be thermally treated in an inert atmosphere (e.g., nitrogen, argon, helium) or in a flowing oxygen-containing atmoshpere (e.g., air) with or without stress at a temperature below the polymer melting temperature until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 15° to 20° C. below the temperature at which it melts for about 48 hours. Optimum heat treatment conditions will vary with the specific composition of the wholly aromatic polyester and with the article's process history.

A molding compound may be formed from the wholly aromatic polyester of the present invention which incorporates approximately 1 to 60 percent by weight of a solid filler (e.g., talc) and/or reinforcing agent (e.g., glass fibers).

The wholly aromatic polyester also may be employed as a coating material which is applied as a powder or from a liquid dispersion.

The following examples are presented as specific illustrations of the claimed invention. It should be understood, however, that the invention is not limited to the specific details set forth in the examples.

EXAMPLE I

To a 300 ml. three-neck round flask equipped with a mechanical stirrer, argon inlet tube, and a distillation head connected to a condenser were added the following:

(a) 54.0 g. of para-acetoxybenzoic acid (0.258 mole),
(b) 46.6 g. of 4-acetoxy-3-bromobenzoic acid (0.18 mole), and
(c) 21.6 g of meta-acetoxybenzoic acid (0.12 mole).

The flask was placed in an oil bath at 250° C. while employing a slow argon purge. The reactants while under the argon purge melted to form a clear melt. Approximately 10 minutes following the formation of the melt at 250° C. the distillation of acetic acid began, and the contents of the flask were stirred for 55 minutes at 250° C. Following the 55 minutes of heating at 250° C. 20 ml. of acetic acid were collected, and insoluble reaction products rendered the contents of the flask cloudy in appearance. Over a period of 2 hours and thirty minutes the oil bath temperature was raised from 250° C. to 305° C. during which time an additional 9 ml. of acetic acid were collected to yield a total of 84.5 percent of the theoretical amount. At this point the bath temperature was raised to 320° C. The argon flow was terminated and the pressure was reduced to 0.1 Torr over a 30 minute period. Polymerization was continued for an additional 1 hour at 320° C. while at 0.1 Torr.

The polymer product had an inherent viscosity (I.V.) of 1.15 dl./gram was dissolved in a concentration of 0.03 weight/volume percent in pentafluorophenol at 60° C. The inherent viscosity was determined in accordance with the following equation:

$$I.V. = \frac{\ln (\eta\ rel)}{c}$$

where c=concentration of solution (here 0.03 weight-/volume percent), and $\eta$ rel=relative viscosity. The relative viscosity was measured as the ratio of the time required for polymer solution to flow through a viscometer to the time required for the solvent alone to flow through the viscometer. The apparatus used was an Ubbelohde dilution type 100 viscometer.

Differential scanning calorimetry indicated that the polymer had no crystalline melting point. When viewed through crossed-polarizers on a hot stage microscope the polymer melt was anisotropic. When analyzed via thermal mechanical analysis using a penetration probe the polymer began to deform at approximately 185° C. and was deformable above 200° C. The polymer was suitable for injection molding while at a temperature of approximately 240° to 300° C.

EXAMPLE II

Example I was substantially repeated except as indicated below.

To the 300 ml. three-neck round bottom flask equipped with a mechanical stirrer, argon inlet tube, and a distillation head connected to a condenser were added the following:

(a) 43.2 g. of para-acetoxybenzoic acid (0.24 mole),
(b) 62.2 g. of 4-acetoxy-3-bromobenzoic acid (0.24 mole), and
(c) 21.6 g. of meta-acetoxybenzoic acid (0.12 mole).

The polymer product had an inherent viscosity of 1.82 dl./gram when dissolved in a concentration of 0.03 weight/volume percent in pentafluorophenol at 60° C. When analyzed via thermal mechanical analysis using a penetration probe the polymer began to deform at approximately 140° C. The polymer was suitable for injection molding while at a temperature of approximately 200° to 300° C.

Although the invention has been described with preferred embodiments it is to be understood that variations and modifications may be employed without departing from the concept of the invention as defined in the following claims.

I claim:

1. A melt processable wholly aromatic polyester capable of forming an anisotropic melt phase at a temperature below approximately 300° C. consisting essentially of the recurring moieties I, II, and III wherein:

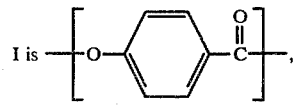

II is 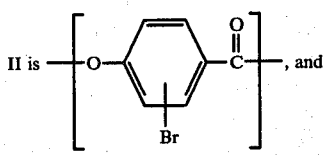, and

III is 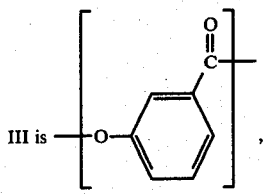, wherein said polyester comprises approximately 35 to 70 mole percent of moiety I, approximately 15 to 45 mole percent of moiety II, and approximately 15 to 45 mole percent of moiety III.

2. A melt processable wholly aromatic polyester according to claim 1 which is capable of forming an anisotropic melt phase at a temperature below approximately 290° C.

3. A melt processable wholly aromatic polyester according to claim 1 which is capable of forming an anisotropic melt phase at a temperature below approximately 280° C.

4. A melt processable wholly aromatic polyester according to claim 1 which is capable of being injection molded to form a three-dimensional shaped article while at a temperature of approximately 240° to 350° C.

5. A melt processable wholly aromatic polyester according to claim 1 wherein recurring moieties I, II and III are the sole moieties present.

6. A melt processable wholly aromatic polyester according to claim 1 which exhibits an inherent viscosity of at least 1 dl./gram when dissolved in a concentration of 0.03 weight/volume percent in pentafluorophenol at 60° C.

7. A melt processable wholly aromatic polyester according to claim 1 which exhibits an inherent viscosity of approximately 1.5 to 4 dl./gram when dissolved in a concentration of 0.03 weight/volume percent in pentafluorophenol at 60° C.

8. A molding compound comprising the melt processable wholly aromatic polyester of claim 1 which incorporates approximately 1 to 60 percent by weight of a solid filler and/or reinforcing agent.

9. A molded article comprising the melt processable wholly aromatic polyester of claim 1.

10. A melt processable wholly aromatic polyester capable of forming an anisotropic melt phase at a temperature below approximately 300° C. consisting essentially of the recurring moieties I, II, and III wherein:

I is 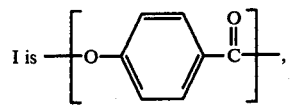,

II is 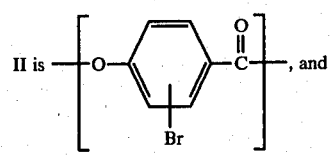, and

III is 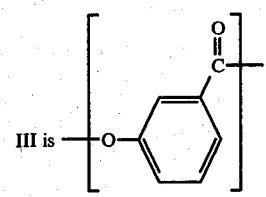, wherein said polyester comprises approximately 40 to 50 mole percent of moiety I, approximately 30 to 40 mole percent of moiety II, and approximately 15 to 25 mole percent of moiety III.

11. A melt processable wholly aromatic polyester according to claim 10 which is capable of forming an anisotropic melt phase at a temperature below approximately 290° C.

12. A melt processable wholly aromatic polyester according to claim 10 which is capable of forming an anisotropic melt phase at a temperature below approximately 280° C.

13. A melt processable wholly aromatic polyester according to claim 10 which is capable of being injection molded to form a three-dimensional shaped article while at a temperature of approximately 240° to 350° C.

14. A melt processable wholly aromatic polyester according to claim 10 wherein moieties I, II, and III are the sole moieties present.

15. A melt processable wholly aromatic polyester according to claim 10 which comprises approximately 50 mole percent of moiety I, approximately 30 mole percent of moiety II, and approximately 20 mole percent of moiety III.

16. A melt processable wholly aromatic polyester according to claim 10 which comprises approximately 40 mole percent of moiety I, approximately 40 mole percent of moiety II, and approximately 20 mole percent of moiety III.

17. A melt processable wholly aromatic polyester according to claim 10 which exhibits an inherent viscosity of at least 1 dl./gram when dissolved in a concentration of 0.03 weight/volume percent in pentafluorophenol at 60° C.

18. A melt processable wholly aromatic polyester according to claim 10 which exhibits an inherent viscosity of approximately 1.5 to 4 dl./gram when dissolved in a concentration of 0.03 weight/volume percent in pentafluorophenol at 60° C.

19. A molding compound comprising the melt processable wholly aromatic polyester of claim 10 which incorporates approximately 1 to 60 percent by weight of a solid filler and/or reinforcing agent.

20. A molded article comprising the melt processable wholly aromatic polyester of claim 1.

* * * * *